(12) United States Patent
Salz

(10) Patent No.: US 7,422,274 B2
(45) Date of Patent: Sep. 9, 2008

(54) ROOF FOR A MOTOR VEHICLE

(75) Inventor: Wolfram Salz, Sachsenheim (DE)

(73) Assignee: CTS Fahrzeug-Dachsysteme GmbH, Bietigheim-Bissingen (DE)

( * ) Notice: Subject to any disclaimer, the term of this patent is extended or adjusted under 35 U.S.C. 154(b) by 0 days.

(21) Appl. No.: 11/382,378

(22) Filed: May 9, 2006

(65) Prior Publication Data

US 2006/0261642 A1   Nov. 23, 2006

(30) Foreign Application Priority Data

May 10, 2005   (GB)   ................. 10 2005 021 465

(51) Int. Cl.
*B60J 7/22* (2006.01)
(52) U.S. Cl. .................................... 296/217
(58) Field of Classification Search ............. 296/217
See application file for complete search history.

(56) References Cited

U.S. PATENT DOCUMENTS

| | | | |
|---|---|---|---|
| 4,396,224 A * | 8/1983 | Hayakawa | 296/217 |
| 4,801,174 A | 1/1989 | Hirshberg et al. | |
| 5,052,745 A * | 10/1991 | Preiss | 296/217 |
| 5,660,429 A * | 8/1997 | Wienchol | 296/217 |
| 6,364,408 B1 * | 4/2002 | Frascaroli et al. | 296/217 |
| 6,837,538 B2 * | 1/2005 | Itoh et al. | 296/216.06 |
| 7,032,963 B2 * | 4/2006 | Deppe et al. | 296/217 |

FOREIGN PATENT DOCUMENTS

| | | | | |
|---|---|---|---|---|
| DE | 3925808 | * | 2/1991 | ............... 296/217 |
| DE | 4012569 | * | 5/1991 | ............... 296/217 |
| DE | 4033027 | * | 4/1992 | ............... 296/217 |
| DE | 4126568 | * | 2/1993 | |
| DE | 42 03 229 A1 | | 8/1993 | |
| DE | 43 35 653 A1 | | 4/1995 | |
| DE | 699 09 356 T2 | | 5/2004 | |
| EP | 586245 | * | 3/1994 | ............... 296/217 |

* cited by examiner

*Primary Examiner*—Dennis H Pedder
(74) *Attorney, Agent, or Firm*—Brooks Kushman P.C.

(57) ABSTRACT

A roof for a passenger motor vehicle is disclosed that comprises at least a first roof element extending above the vehicle's passengers in the front seats of the vehicle. The first roof element may be moved along side roof frames and has a first transverse section that borders a second transverse of a second roof element. Recessed areas are provided between the first transverse section of the roof element and the second transverse section of the roof element. The recessed areas provide the front seat passengers with enlarged viewing areas.

15 Claims, 2 Drawing Sheets

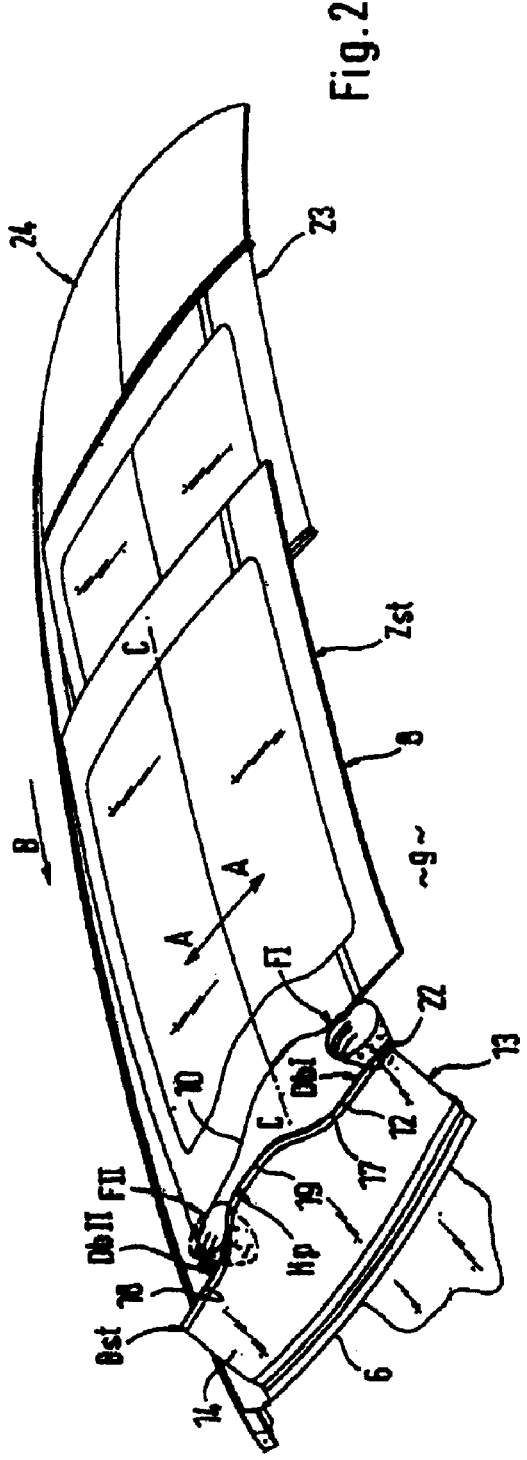
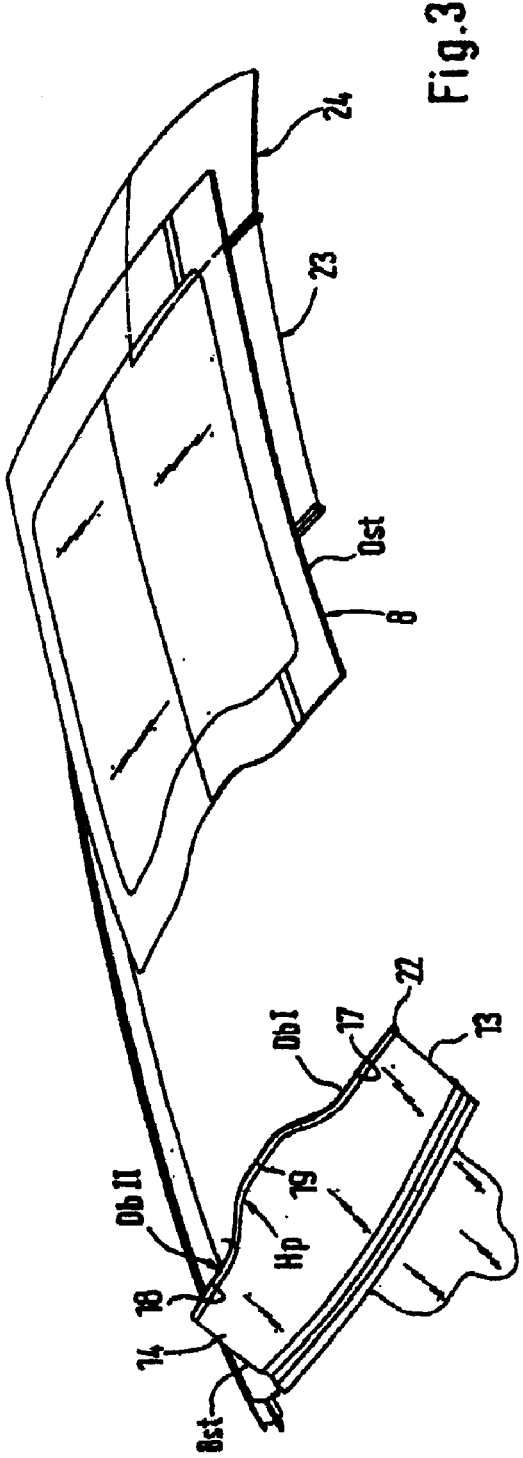

ROOF FOR A MOTOR VEHICLE

CROSS-REFERENCE TO RELATED APPLICATIONS

This application claims priority to German application Serial No. 10 2005 021 465.7, filed May 10, 2005.

BACKGROUND OF THE INVENTION

1. Field of the Invention

The present invention relates to a roof for a motor vehicle that has a contoured edge defined by adjacent movable panels.

2. Background Art

A passenger vehicle is disclosed in U.S. Pat. No. 4,801,174 that is equipped with a roof having a sliding roof element that extends between a windshield header and a rear window frame. The roof element consists of transparent material and is made to slide in the longitudinal direction. The roof element has a first transverse section that closes against a second transverse section of the header of the windshield frame.

German application DE 43 35 653 A1 discloses a passenger vehicle roof that has several roof sections over its length that extend in the vehicle's longitudinal direction. A first angularly mobile roof section pivots on a windshield frame and has a transverse section that is adjacent to another transverse section of a second roof section. Both roof sections of this application consist of translucent glass. A similar design is disclosed in DE 42 03 229 A1.

The present invention is an improvement over the above references, as summarized below.

SUMMARY OF THE INVENTION

One objective of this invention is to create a passenger vehicle roof that is equipped with several roof elements that are configured to optimize the view of the vehicle's passengers.

One advantage of the invention is that enlarged viewing areas are formed by recessed areas in a transverse section of a roof element. The enlarged viewing areas make it easier for passengers in the front seat to observe objects that are disposed above the passenger vehicle. The second roof element is an angularly pivoted wind defector in which the recessed areas are formed relatively to a transverse structural plane. The recessed areas are provided on both sides of the passenger vehicle's longitudinal center plane above the driver and front seat passenger. The recessed areas extend in a lateral direction away from a protruding central portion of the second transverse section of the second roof element. The boundaries of the recessed areas of the second transverse section extend toward side roof frames at an angle to the transverse structural plane. The wind defector tapers to a reduced width in the vehicle's transverse direction. The recessed areas and projecting areas of the second transverse section of the second roof element are shaped to improve the aerodynamic effect of the second roof element that reduces the drag coefficient and also reduces noise.

Other advantages and improvements achieved by Applicant's invention will be apparent to one of ordinary skill in the art in view of the attached drawings and following detailed description of the illustrated embodiment.

BRIEF DESCRIPTION OF THE DRAWINGS

FIG. 2 is a perspective view similar to FIG. 1 showing the roof elements in a partially open position; and FIG. 3 is a perspective view similar to FIG. 1 showing the roof elements in a fully open position.

DETAILED DESCRIPTION OF THE PREFERRED EMBODIMENT(S)

Figure 1:
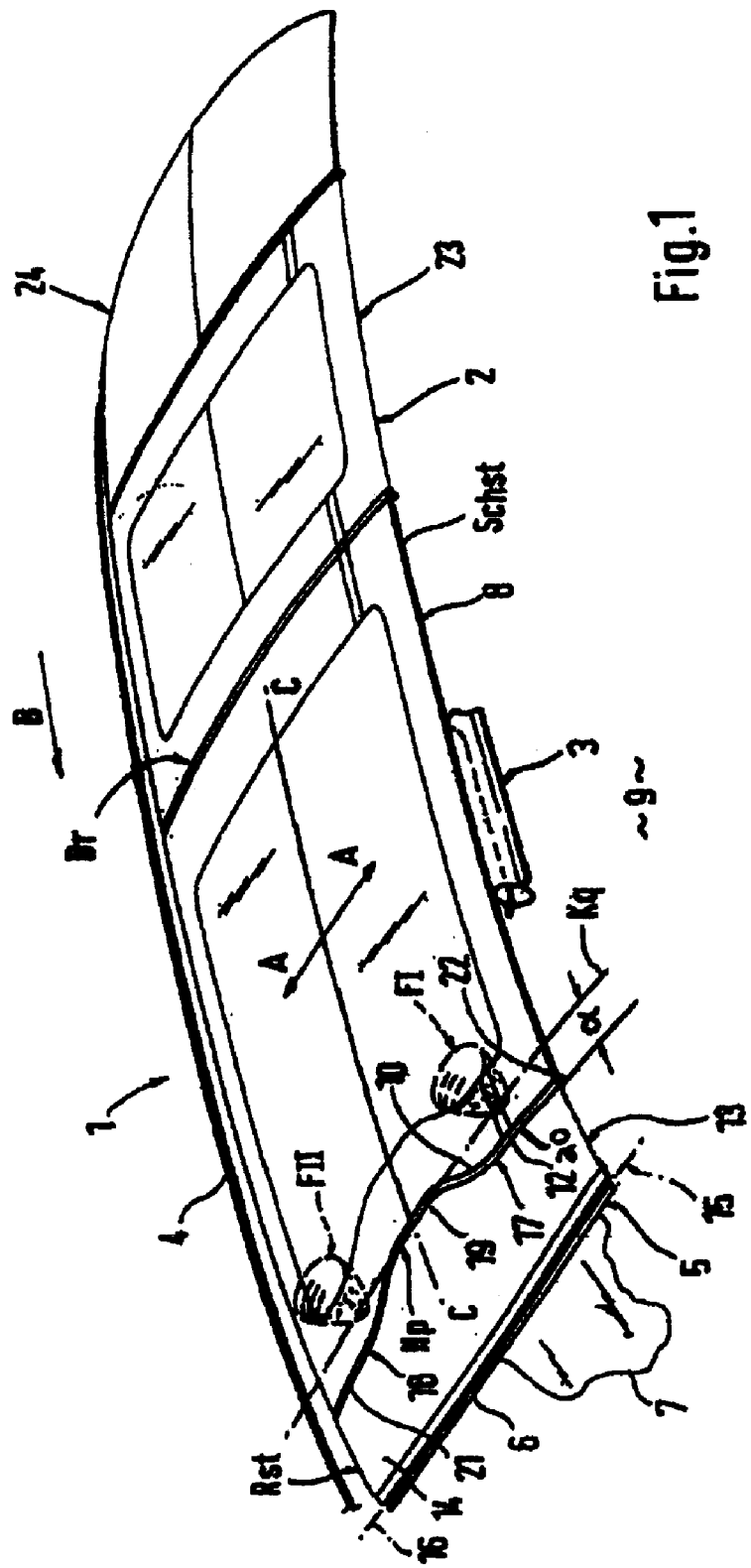
FIG. 1 is a perspective view of a passenger vehicle roof having several roof elements.

Referring to FIG. 1, a portion of a vehicle 1 comprising the roof 2 is illustrated. The roof is bordered on one side by side roof frames 3 and 4 and on the other side by a windshield frame 5. Windshield frame 5 is supported by vertical pillars, or A pillars (not shown), and has a cross bar 6 extending in the vehicle's transverse direction A-A that support a windshield 7.

Roof 2 comprises a first roof element 8 that extends above the passengers, driver FI and right front passenger FII when seated in the passenger compartment 9 of the vehicle 1. The first roof element 8 has a first front transverse section 10 that borders a second rear transverse section 12 of a second roof element 13. The second roof element 13 is disposed in front of the first roof element 8 when viewed in the direction of travel B. The second roof element 13 is an angularly pivotable wind deflector 14 that is supported on schematically indicated hinges 15 and 16 adjacent the cross bar 6 of the windshield frame 5.

Recessed areas 17 and 18 are provided on the second roof element 13 to provide the passengers FI and FII with enlarged viewing areas DbI and DbII. The viewing areas DbI and DbII that are provided above the wind deflector 14, particularly when it is pivoted from its lowered position, as shown in FIG. 1, into its raised, or operating, position, as shown in FIG. 2. The recessed areas 17 and 18 are provided between the first transverse section 10 of the first roof element 8 and the second transverse section 12 of the second roof element 13. The recessed areas 17 and 18 are recessed from a transverse structural plane Kq, that extends between the first transverse section 10 and the second transverse section 12. The recessed areas are provided on both sides of a longitudinal center plane C-C of the passenger vehicle 1. In the illustrated embodiment, recessed areas 17 and 18 extend laterally away from a projecting area 19 of the second transverse section 12. The projecting area 19 and recessed areas 17 and 18 form a top hat profile Hp. The projecting area 19 and the recessed areas 17 and 18 of transverse section 13 are configured to produce improved aerodynamic performance when the wind deflector 14 is in its raised position, as shown in FIG. 2. These aerodynamic effects can reduce air resistance and noise.

The recessed areas 17 and 18 of the second transverse section have boundaries 20 and 21 that form an angle α to the transverse structural plane Kq. Boundaries 20 and 21 are shaped so that the edge of the wind deflector 14 and the second roof element 13 taper in the vehicle's transverse direction A-A. The first transverse section 10 of the first roof element 8 is matched to the shape of the projecting area 19 and the recessed areas 17 and 18 of the second transverse section 10 of the second roof element 13.

A seal 22 is provided between transverse sections 10 and 12 that cooperate and extend over the entire width of the wind deflector. The seal 22 may be fastened to either the second transverse section 12 of the second roof section 13 or to the wind deflector 14.

Referring to FIG. 1, the roof 2 is shown in its closed position. The first roof element 8 is in a closed position Schst and the wind deflector 14 of the second roof element 13 is shown in its parked position Rst. The first roof element 8 is bordered in a rear area Br by a third roof element 23. The third roof element 23 is assembled in a stationary manner in the body 24 of the vehicle 1. Roof elements 8, 13 and 23 are aligned to provide a flush surface and may consist of transparent glass.

Referring to FIG. 2, wind deflector 14 is shown in the raised, or operating, position Bst, and the first roof element 8 is partially opened by sliding in the longitudinal direction, opposite to the direction of travel B. The first roof element 8 is shown in an intermediate position Zst, with the first roof element being at least partially disposed over the third roof element 23.

Referring to FIG. 3, the second roof element 8 is shown in its completely open position Ost. When the wind deflector 14 is placed in the raised, or operating, position Bst, as shown in FIGS. 2 and 3, the passengers are provided with a largely unobstructed view upwardly to the outside for passengers FI and FII through the viewing areas DbI and DbII.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A roof for a vehicle, the roof comprising:
a first roof element movable in a longitudinal vehicle direction along a pair of side roof frames between a closed position in which the first roof element extends in a roof line and covers a portion of a vehicle passenger compartment and an opened position in which the first roof element exposes the portion of the compartment, the first roof element having a front transverse section; and
a second roof element disposed in front of the first roof element, the second roof element having a rear transverse section, the second roof element being pivotable between a lowered position in which the second roof element extends in the roof line and a raised position in which the second roof element is angularly pivoted such that the rear transverse section is raised above the roof line, wherein the rear transverse section includes a central vertically projecting area and a pair of recessed areas extending laterally in a transverse vehicle direction from respective sides of the central projecting area, wherein the central projecting area and the recessed areas extend in the roof line when the second roof element is lowered, wherein the recessed areas are shaped to provide passengers in the compartment with viewing areas above the second roof element when the second roof element is raised;
wherein the shape of the front transverse section corresponds to the shape of the rear transverse section such that the transverse sections border one another in the roof line when the first roof element is closed and the second roof element is lowered;
wherein the recessed areas are recessed in the longitudinal vehicle direction from a transverse structural plane between the transverse sections when the first roof element is closed and the second roof element is lowered;
wherein the second roof element and the rear transverse section comprise the same transparent material with the rear transverse section being formed from the second roof element.

2. The roof according to claim 1, wherein the second roof element is designed in a form of an angularly pivoted wind deflector.

3. The roof according to claim 1, wherein the recessed areas in the rear transverse section are provided on both sides of a longitudinal center plane of the vehicle.

4. The roof according to claim 1, wherein the projecting area and the recessed areas form a top hat profile.

5. The roof according to claim 1, wherein the boundaries of the recessed areas of the rear transverse section extend toward the side roof frames forming an angle ($\alpha$) to the transverse structural plane when the second roof element is lowered.

6. The roof according to claim 1, wherein the boundaries of the recessed areas taper from the projecting area in the transverse vehicle direction.

7. The roof according to claim 1, further comprising a seal that extends between the transverse sections.

8. The roof according to claim 7, wherein the seal is provided on the rear transverse section of the second roof element.

9. The roof according to claim 8, wherein the recessed areas and the projecting area of the rear transverse section of the second roof element are shaped to reduce both noise and drag coefficient.

10. A roof for a vehicle, the roof comprising:
a roof panel movable along a pair of longitudinally extending side roof frames to extend in a roof line over a portion of a passenger compartment of the vehicle, the roof panel has a front transversely extending contoured edge; and
a wind deflector disposed in front of the roof panel, the wind deflector having a rear transversely extending contoured edge, the wind deflector being pivotable between a lowered position in which the wind deflector extends in the roof line and a raised position in which the wind deflector is angularly pivoted such that the rear edge is raised above the roof line, the rear edge defining a vertically projecting central area and pair of recessed areas in the wind deflector that extend in the roof line when the wind deflector is lowered and reduce the length of the wind deflector longitudinally to provide passengers in the passenger compartment with expanded viewing areas above the wind deflector when the wind deflector is raised;
wherein the shape of the front edge corresponds to the shape of the rear edge such that the edges border one another in the roof line when the roof panel extends over the portion of the passenger compartment and the wind deflector is lowered;
wherein the recessed areas are longitudinally recessed from a transverse structural plane between the edges when the roof panel extends over the portion of the passenger compartment and the wind deflector is lowered;
wherein the wind deflector and the rear edge comprise the same transparent material with the rear edge being formed from the wind deflector.

11. The roof according to claim 10, wherein the recessed areas are provided on both sides of a longitudinal center plane of the vehicle.

12. The roof according to claim 10, wherein the recessed areas lead away from the central protruding area of the rear transversely extending contoured edge.

13. The roof according to claim 10, wherein the recessed areas of the rear transversely extending contoured edge extend toward the side roof frames forming an angle ($\alpha$) to a transverse structural plane.

14. The roof according to claim 13, wherein the recessed areas of the wind deflector are tapered in the transverse vehicle direction to provide a wind deflector of reduced width closer to the side roof frames.

15. The roof according to claim 10, wherein the recessed areas of the wind deflector are shaped to reduce both noise and drag coefficient.

* * * * *